H. I. BENEDICT.

LIFTING JACK.

APPLICATION FILED JAN. 19, 1918.

Reissued Apr. 23, 1918. 14,465.

WITNESSES

Frank J. Fagiani.

A. L. Ritchie

INVENTOR

H. I. Benedict

BY Munn & Co.

ATTORNEYS

UNITED STATES PATENT OFFICE.

HENRY I. BENEDICT, OF NEW YORK, N. Y., ASSIGNOR OF ONE-HALF TO ALBERT F. WAGNER, OF NEW YORK, N. Y.

LIFTING-JACK.

14,465. Specification of Reissued Letters Patent. Reissued Apr. 23, 1918.

Original No. 1,234,606, dated July 24, 1917. Serial No. 140,722, filed January 5, 1917. Application for reissue filed January 19, 1918. Serial No. 212,788.

*To all whom it may concern:*

Be it known that I, HENRY I. BENEDICT, a citizen of the United States, and a resident of the city of New York, borough of Manhattan, in the county and State of New York, have invented a new and Improved Lifting-Jack, of which the following is a full, clear, and exact description.

This invention relates to lifting jacks of that type in which the movable element embodies a screw which is turned through a crank-operated gearing.

The invention has for its general objects to improve and simplify the construction and operation of devices of this character so as to be reliable and efficient in use, comparatively simple and inexpensive to manufacture, of durable and substantial design, and capable of having a large range of movement, although the jack is of compact construction.

Another object of the invention is to provide a jack in which the weight is carried centrally thereby on suitable bearings at the bottom.

A further object of the invention is the provision of a construction wherein the threads and most of the moving parts are inclosed in an oiltight and substantially dust-proof casing.

A more specific object of the invention is the provision of a jack in which the elevating element embodies a buttress screw which is engaged by releasable dogs on the vertically movable section of the jack, there being novel means for releasing the dogs so that the jack can be easily and quickly collapsed and at the same time the screw and dogs permit the vertically movable element to be raised or pulled out without operating the gearing, thus enabling the jack to be quickly adjusted to the load or object to be lifted.

With such objects in view, and others which will appear as the description proceeds, the invention comprises various novel features of construction and arrangement of parts which will be set forth with particularity in the following description and claims appended hereto.

In the accompanying drawing which illustrates one embodiment of the invention and wherein similar characters of reference indicate corresponding parts in all the views, Figure 1 is a vertical section of the jack with an operating crank applied thereto;

Figures 1, 2, 3:
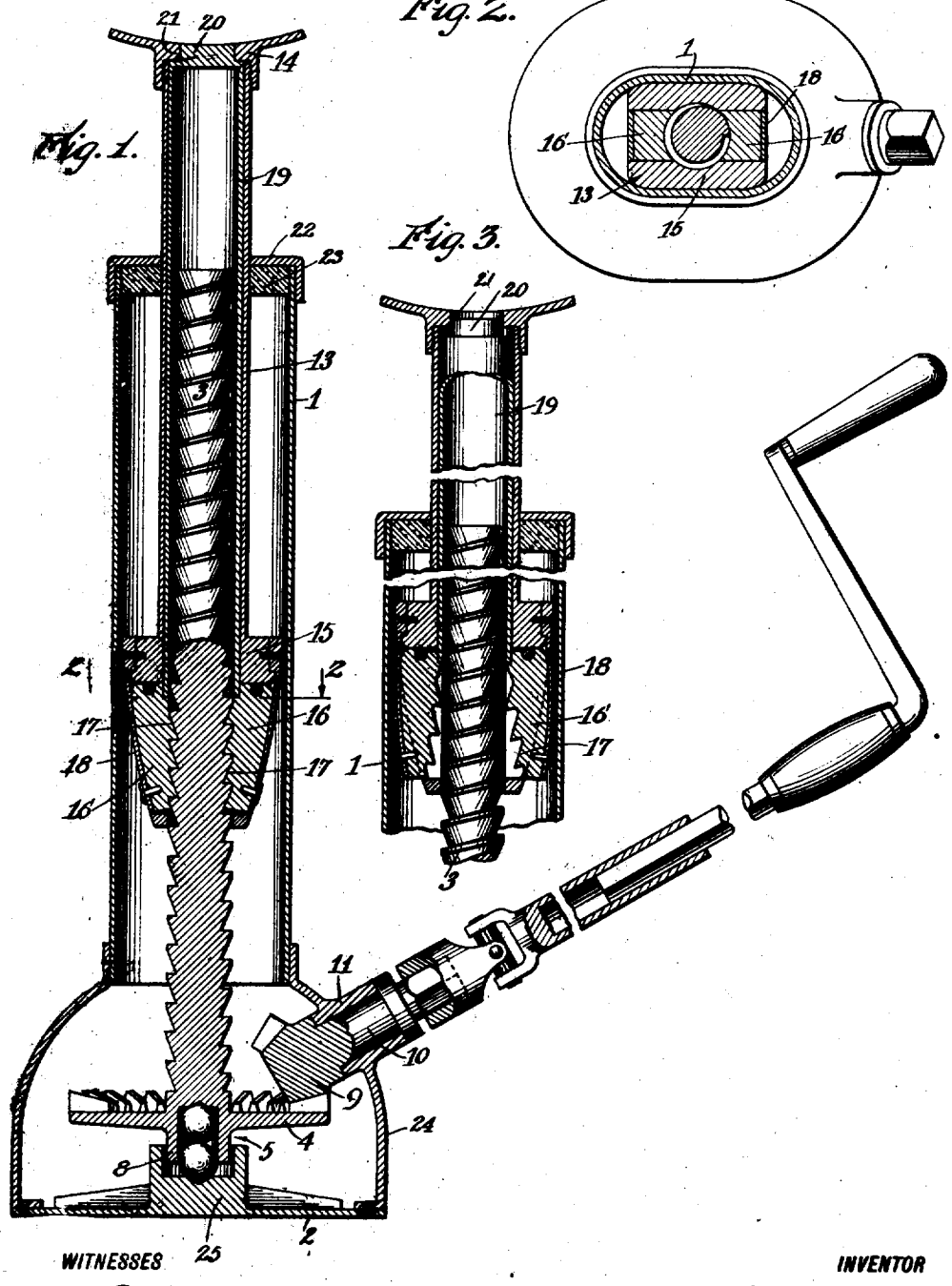
Fig. 2 is a horizontal section on the line 2—2, Fig. 1.
Fig. 3 is a sectional view with portions broken away and showing the dogs released from the buttress screw.

Referring to the drawing, 1 designates the tubular body of the casing which is enlarged at its bottom to accommodate the gearing, and on the lower end of the casing is removably fastened a bottom plate 2. Extending centrally of the casing is a buttress screw 3 which has fastened to its lower end a gear wheel 4, and between this gear wheel and the bottom plate 2 is a step bearing 5 composed of two balls 6 and 7 resting one on top of the other and confined within a socket 8 on the bottom side of the gearing, the lowermost ball bearing on the bottom plate 2. Meshing with the gear is a pinion 9 fixed on a short shaft 10 journaled in a bearing 11 in the casing, the shaft 10 being inclined at an angle to the axis of the screw and having a squared outer end to receive an operating crank 12.

Slidable in the casing is the vertically movable element 13 in the form of a tube which has on its upper end a load-engaging cap-piece 14. The lower or inner end of the tube 13 is formed with a head 15 recessed at opposite sides to accommodate the dogs 16, which have teeth 17 to engage the threads of the buttress screw. These dogs are carried by springs 18 which yieldingly maintain the dogs engaged by the screw. The teeth of the dogs are so shaped that they will slide upwardly on the threads of the screw, whereas they resist a downward movement on the screw, and it is necessary to release the dogs before the vertically movable section of the jack can be lowered. For this purpose a push button release device is employed, the same consisting of a tube 19 slidable in the outer tube 13, and the lower end engages with the dogs so that by being pressed downwardly the dogs are thrown outwardly from the screw. The upper end of the member 19 has a pushbutton 20 which lies within an opening 21 in the cap-piece 14, so that by pressing down on the pushbutton the dogs are released and the jack can be collapsed. The casing is preferably filled with lubricant so that all the moving parts can work with the maximum freedom. A jack of this construction is of neat and attractive appearance, of durable and substantial design, capable of lifting a great load, and can be easily and quickly adjusted by reason of the particular form of dog-releasing means.

In order to permit the use of lubricant in the jack it will be noted that the base of the jack is tight as well as the tubular body 1 and that a cap 22 is fitted on to the top of the body 1 and held in position in any desired manner, as for instance by friction, while beneath this cap a packing member 23 is provided which prevents the entrance of dust, water and the like, and also prevents the outflow of the oil in the body 1 or base 2. This structure permits not only the use of oil for keeping the parts properly lubricated at all times, but prevents water and other objectionable matter entering when the jack is being used in the rain or water is liable to be thrown thereon.

In addition to these desirable features the bottom plate 2 in addition to having the base member 24 connected therewith is provided with an enlargement 25 for supporting the bearing members 6 and 7 in alinement. This provides ample support for the weight of the article being raised and acts properly at all times by reason of the fact that the screw 3 does not travel upwardly, but merely rotates and the dogs 16 travel upwardly or downwardly as the case may be. This structure causes the weight and the center thrust to be continually on the center of the jack and at the base thus avoiding the usual objection of becoming unstable when the supporting nut of the ordinary jack is raised to a high point.

From the foregoing description taken in connection with the accompanying drawing the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. A jack comprising a body section, a vertically movable section slidable in the body section, a screw in the body section, means for turning the screw, dog on the movable section and normally engaging the screw, and means within the movable section for releasing the dog to permit the movable section to be adjusted independently of the screw.

2. A jack comprising a body section, a vertically movable section, a buttress screw mounted in the body section, dogs on the movable section and normally engaging the screw, a pushbutton device for simultaneously releasing the dogs to permit the movable section to be adjusted independently of the screw.

3. A jack comprising a body section, a tubular movable section, a dog thereon, a screw extending axially of the said sections and normally engaged by the dog, and a longitudinally movable member surrounding the screw for releasing the dog.

4. A jack comprising a body section, a vertical screw therein, means for turning the screw, a vertically movable section in the body section, dogs on the movable section and having screw-engaging teeth, the threads of the screw and the said teeth being so shaped that the movable section can be pulled outwardly while the screw is stationary, and means within and movable with the movable section for releasing the dogs to permit the movable section to be moved downwardly independently of the screw.

5. A jack comprising a body section, a screw extending vertically therein, a gear on the screw, a step bearing between the bottom of the screw and the bottom of the casing, a pinion meshing with the gear for turning the same, a vertically movable load-carrying element in the casing, dogs thereon for engaging the screw, an inner tubular member within the movable member and normally engaging the dogs, and means at the upper end of the vertically movable member for operating the inner member to release the dogs.

6. A jack comprising a supporting bottom plate, a screw having a thread arranged so that the lower end will bear against said bottom plate, a vertical movable element, a threaded member connected with said vertical movable element engaging said thread on said screw, and means for releasing said threaded member at any point along the screw.

7. A jack comprising a body section, a vertically movable section slidable in the body section, a screw having a buttress thread positioned in the body section, means for turning the screw, a dog on the movable section normally engaging the screw, and means coacting with the dog for releasing the same, to permit the movable section to be adjusted independently of the screw.

8. A jack comprising a body section, a vertically movable section extending into said body section, a dog on said movable section, a screw extending axially of said body section normally engaging the dog, and means connected with said dog for releasing the same at any point along said screw so that the movable section may be moved longitudinally of the screw independently thereof.

9. A jack comprising a body section, a vertical screw arranged therein, means for turning the screw, a vertically movable section in the body section, dogs on the movable section formed with screw engaging teeth, the threads of the screw and the said teeth being so shaped that the movable section can be pulled outwardly while the screw is stationary, and means connected with said dogs for releasing the dogs at any point along the screw to permit the movable section to be moved downwardly independently of the screw.

HENRY I. BENEDICT.